United States Patent [19]

Mole et al.

[11] 3,900,505

[45] Aug. 19, 1975

[54] CATALYSED REACTION OF ALUMINUM COMPOUNDS WITH NITRILES

[75] Inventors: Thomas Mole, East Melbourne; Aivars Meisters, North Coburg, both of Australia

[73] Assignee: Commonwealth Scientific and Industrial Research Organization, Campbell, Australia

[22] Filed: Dec. 12, 1972

[21] Appl. No.: 314,384

[30] Foreign Application Priority Data

Dec. 13, 1971 Australia.............................. 7363/71

[52] U.S. Cl.......... 260/448 A; 260/566 R; 260/590; 260/592; 260/593 R
[51] Int. Cl. .............................................. C07f 5/06
[58] Field of Search................................ 260/448 A

[56] References Cited
UNITED STATES PATENTS
3,143,542   8/1964   Ziegler et al................ 260/448 A X

OTHER PUBLICATIONS

Pasynkiewicz et al., J. Organometal Chem., Vol. 10, pp. 23–24, (1967).

Starowieyski et al., J. Organometal Chem., Vol. 10, pp. 393–400, (1967).

Kuran et al., J. Organometal Chem., Vol. 23, pp. 343–356, (1970).

Primary Examiner—H. Sneed
Attorney, Agent, or Firm—Bacon & Thomas

[57] ABSTRACT

A method for effecting the reaction of an aluminum trialkyl or triaryl with a nitrile comprises mixing the reactants at a suitable temperature and in the presence of a catalyst comprising a transition metal, and optionally in the presence of a solvent which is inert with respect to the reactants. Ketones or imines may be produced from the reaction product by alkaline or acid hydrolysis, respectively.

6 Claims, No Drawings

CATALYSED REACTION OF ALUMINUM COMPOUNDS WITH NITRILES

This invention relates to an improved method for effecting the known reaction of aluminium alkyls and aryls with nitriles. Specifically the invention is concerned with the use of an appropriate catalyst which allows a nitrile (I) to be more readily alkylated or arylated, by an aluminium trialkyl or triaryl (II), to give an imido aluminium compound (III). Hydrolysis of this product will give either a ketone (IVa) or an imine (IVb), according to the general equation:

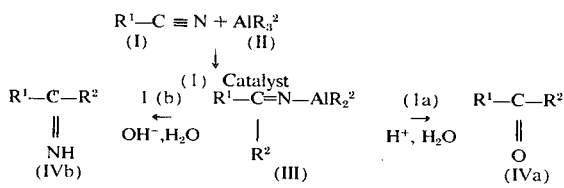

where $R^1$ and $R^2$ are organic radicals as hereinafter defined.

Thus the invention is also concerned with an improved method for the preparation of ketones and imines involving the reaction sequence just described. The reaction is likely to be of particular value when applied to the production of ketones.

The known methods for converting nitriles to ketones are those involving, in order of preference, Grignard reagents, organolithium compounds, and aluminium alkyls. In many cases, these reactions give low yields of the desired ketone together with considerable amounts of undesirable by-products which stem from proton removal from the nitrile followed by condensation.

Thus Kharasch and Reinmuth, comprehensively surveying the reactions of nitriles in "The Grignard Reactions of Non-Metallic Substances" (Prentice-Hall, 1954), cite many examples of the condensation of nitriles, particularly benzyl cyanides, to β-cyanoimines.

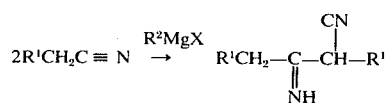

According to Hauser et al. (J. Org. Chem. 15 (1950) 359) only an 8 percent yield of benzyl methyl ketone is obtained from benzyl cyanide and methylmagnesium iodide.

Triorganoaluminiums react with nitriles only at high temperatures (above 100°C). Again side reactions occur where the nitrile has "acidic" methylene protons. Jennings, Lloyd and Wade (J. Chem. Soc. (1965) 5083) report dominant evolution of alkane (or other hydrocarbon), rather than alkylation (or arylation) of the nitrile, on reaction of various triorganoaluminiums with acetonitrile or propionitrile. Alkylation of nitriles by trialkylaluminiums is more facile when 2 moles of organoaluminium are used per mole of nitrile, but still requires temperatures over 100° and is still accompanied by side reactions.

In accordance with one aspect of the present invention there is provided a method for effecting the reaction of an aluminium trialkyl or triaryl with a nitrile which comprises mixing the reactants in an inert solvent at a suitable temperature and in the presence of a catalyse comprising a transition metal.

More specifically the invention provides a method for effecting the reaction of an aluminium compound of formula II stated above with a nitrile of formula I, also as stated above, wherein $R^1$ is a straight or branched-chain, saturated or unsaturated, aliphatic or cycloaliphatic group; aralkyl or aryl group with or without ring substituents; or a heterocyclic or substituted heterocyclic group; and in which more than one nitrile group may be present; and each of the groups $R^2$ is a straight or branched chain, saturated or unsaturated alkyl group containing up to about 20 carbon atoms; and wherein the $R^2$ groups may be substituted with simple aryl groups, which may be further substituted with lower alkyl or alkoxyl groups or halogen groups.

The scope of the present invention is indicated by the following discussion of the reactants and conditions which may be employed.

REACTANTS i. Nitriles

These may be straight or branched-chain, saturated or unsaturated, aliphatic or cycloaliphatic nitriles; aralkyl or aryl nitriles with or without ring substituents; or heterocyclic or substituted heterocyclic nitriles. More than one nitrile group may be present in the compound. Examples are acetonitrile, amyl cyanide, glutaronitrile, lauronitrile, stearonitrile, benzonitrile, p-chlorobenzonitrile, benzyl cyanide, p-chlorophenylacetonitrile, and diphenylacetonitrile.

ii. Aluminium Compounds

These are trialkyl, triaralkyl and triaryl aluminiums. The alkyl groups may include straight and branched chain, saturated and unsaturated groups up to about $C_{20}$, and they may be substituted with simple aryl groups, such as phenyl, naphthyl, etc. The aryl groups may be simple aryl hydrocarbon groups or they may be substituted with lower alkyl or alkoxyl groups or halogen groups. Typical compounds are trimethyl aluminium, triethyl aluminium, tripropyl aluminium, triisobutyl aluminium, tridecyl aluminium, dimethyl phenylethynyl aluminium, dimethyl butenyl aluminium, and dimethyl benzyl aluminium.

iii. Catalyst

The term "transition metals" as used herein tefers to the metals of the so-called "Transition Series" of the Periodic Classification of the Elements. For the purposes of this specification the elements concerned are those having atomic numbers between 21 and 29 inclusive in the first transition series; between 39 and 47 inclusive in the second transition series; and between 57 and 79 inclusive in the third transition series. A variety of compounds of the transition metals serve as catalysts. Particularly suitable are derivatives of divalent nickel and some derivatives of zero-valent nickel. Good results are obtained with compounds in which the nickel metal is co-ordinated to oxygen containing ligands and with those compounds which are soluble in the reaction medium. Suitable compounds include cobalt[II] acetylacetonate, iron[III] acetylacetonate, nickel acetate, nickel stearate, nickel[II] bisacetylacetonate, nickel[II] bisacetylacetonate dihydrate, nickel[II] bis(diethyl oxaloacetate), and nickel[II].3(ethyl acetoacetate).5(OH).

REACTION CONDITIONS

In general the reaction is carried out by mixing the reactants in an inert solvent at a suitable temperature and then allowing a sufficient time for the reaction to go substantially to completion.

"Inert" in this context simply means that the solvent must not enter into reaction with the reactants. The temperatures most frequently employed are ambient or near ambient but higher or lower temperatures may be used where necessary or desirable, with cooling or heating of the reaction mixture if and when required.

Organoaluminiums are highly reactive towards air and moisture and care must be taken to protect reactions from the atmosphere, commonly by means of a blanketing atmosphere of nitrogen. It is inadvisable to premix the catalyst with the organoaluminium compound. Reactions are normally carried out by slowly adding the triorganoaluminium in solvent to a nitrogen-flushed apparatus containing a stirred solution of the nitrile plus 1–5 mole percent of catalyst. Alternatively first the organoaluminium and then the catalyst may be added to the nitrile, or again first the nitrile then the catalyst may be added to the organoaluminium. The reaction is not instantaneous but proceeds steadily and is allowed to stand — often overnight at ambient temperature — still under the nitrogen atmosphere. Larger scale experiments may require cooling both when the organoaluminium is added to the nitrile and as the reaction proceeds. For more sluggish reactions, it may be desirable to add further catalyst as the reaction proceeds.

REACTION VARIABLES

Solvent

Commonly a hydrocarbon solvent is used, benzene or toluene being well suited. Other aromatic hydrocarbons may be employed, as may liquid aliphatic hydrocarbons such as isopentane, hexane and higher homologues, petroleum fractions and kerosene. Halogenated solvents, such as chlorobenzenes, which are unreactive to the alkyl and aryl aluminium compounds may also be used, and in some cases solvent can be dispensed with altogether.

Reactant Ratio

Usually, a little more than one mole of aluminium compound per mole of nitrile gives satisfactory results. When less reactive or hindered nitriles are used, it is sometimes advantageous to increase the amount of aluminium compound to 2 or more moles per mole of nitrile.

Catalyst

The amount of catalyst required for the reaction varies according to the nature of the reactants. In general, amounts of catalyst from 0.1 mole percent to 5 mole percent w.r.t. nitrile are satisfactory, although greater amount could be added without deleterious effect. Most reactions can be carried out within reasonable time if 1 – 3 mole percent of the catalyst (with respect to nitrile) is used. The catalyst may be added to the nitrile and then mixed with the organoaluminium compound. Alternatively the catalyst may be added to a mixture of other reactants, either at the beginning of reaction or sometimes over a considerable period of time, either continually or in discrete amounts.

Temperature

The optimum temperature range for the reaction appears to be 20° – 50°C. Temperatures below 20°C are sometimes preferred. Higher temperatures can mostly be used to shorten reaction times, but substantial elevation of the temperature appears to lead to deactivation of the catalyst and a fall in yield.

In accordance with a further aspect of the invention, ketones of the formula IV$a$ or imines of the formula IV$b$ stated above are formed by acid or alkaline hydrolysis, respectively of the product of the above-described reaction.

For example, hydrolysis to ketone is suitably accomplished by slowly pipetting or siphoning the reaction solution into a mixture of ether and aqueous hydrochloric acid in a separating funnel fitted with a reflux condenser. Alkane evolved on hydrolysis serves to maintain an inert atmosphere.

The process of this invention thus provides an improved method for converting nitriles into ketones or imines. A wide variety of such compounds can be readily prepared by this method under conditions which are unlikely to cause any decomposition to other parts of the molecule. The process is thus particularly useful in the preparation of fine chemicals, drugs, insecticides and the like.

The invention is illustrated by the following examples.

EXAMPLE I

Methylation of Dodecyl Cyanide

Trimethylaluminium (1.4 ml; 14 mmole) was added rapidly to magnetically stirred n-dodecyl cyanide (1.7 g; 8.7 mmole) in benzene (5 ml) at room temperature. Nickel acetylacetonate in benzene (1.8 ml of a five percent solution) was then added portionwise (0.3 ml at a time) over three days. After three and a half days the products were hydrolysed using a mixture of ether with 2M aqueous hydrochloric acid. The ethereal extract was dried and distilled to give tetradecan-2-one (1.59 g; 81 percent yield) as a sweet smelling, colourless solid, m. 32°–3°, shown to be pure by g.l.c and characterized by its mass spectrum and p.m.r. spectrum.

In another experiment nickel acetylacetonate (144 mg) was added to n-dodecyl cyanide (2.00 g; 10.2 mmole) in toluene. To this stirred solution was added trimethylaluminium (1.28 ml; 12.8 mmole) dropwise. The solution was maintained for 18 hours at 40°, then for five hours at 50°, and finally for 15 hours at 60°. Hydrolysis and distillation gave 1.57 g of distillate, which crystallized at room temperature and was shown by g.l.c. to contain 90% tetradecan-2-one and 10% unchanged n-dodecyl cyanide. (i.e. tetradecan-2-one yield ≈ 70%). Experiments under similar or milder conditions without catalyst gave only 13 percent or less of tetradecan-2-one.

EXAMPLE II

Methylation of Benzonitrile

Trimethylaluminium (1.65g; 22 mmole) in benzene was added slowly by syringe to a stirred solution of benzonitrile (2.06 g; 20 mmole) and nickel acetylacetonate (154 mg; i.e. 3 mole percent w.r.t. nitrile) in benzene in a serum-capped, nitrogen-flushed flask. The reactants at once turned brown, and were then left at room temperature for ca. 70 hours. Hydrolysis by a mixture of ether and 2N aqueous hydrochloric acid followed by distillation gave acetophenone (1.94g; 80 percent yield), with an infra-red spectrum identical with that of authentic material. From a similar experiment without catalyst, the benzonitrile was recovered unchanged.

EXAMPLE III

Methylation of Benzyl Cyanide

Trimethylaluminium (21.4 mmole, as a 4M solution in toluene) was slowly added to a stirred solution of benzyl cyanide (2g; i.e. 17.1 mmole) and nickel acetylacetonate (247 mg; 0.96 mmole) in toluene in a nitrogen-flushed serum-capped flask at −15°. The reaction mixture was allowed to warm to room temperature, then heated to 40° for 16 hours and finally to 70° for 3 hours. Hydrolysis by a mixture of ether and dilute aqueous hydrochloric acid then distillation gave methyl benzyl ketone (1.6 g; 70 percent yield), having an infra-red spectrum identical with authentic material and shown by g.l.c. to consist of only one component.

EXAMPLE IV

Methylation of Diphenylacetonitrile

Diphenylacetonitrile (1.90g; 10 mmole) in benzene (5 ml) was added over a few minutes to a stirred solution of trimethylaluminium (3.0 ml; 30 mmole) in benzene (5 ml) under nitrogen. A solution (4 ml) of nickel acetylacetonate (5 percent) in benzene was prepared and added (0.2 ml at a time) to the other reactants. The first ml was added during 3 hours at room temperature, and a further 3 ml was added during 4 days at 30°C. After a total of 7 days at 30° the products were hydrolyzed using a mixture of ether and dilute aqueous hydrochloric acid. The ether layer was dried and distilled to give a pale yellow oil (1.63g), b. 145°/1.5 mm Hg, shown by g.l.c. to consist of ca. 80 percent 1,1-diphenylacetone with no more than 10 percent of unchanged diphenylacetonitrile.

Chromatography from alumina using benzene eluent gave first various impurities, then fractions continuing diphenylacetonitrile, and finally 1,1-diphenylacetone in 1.1 g (ie. 53 percent) isolated yield. A sample was passed through a SE 30 g.l.c. column and characterized by its p.m.r. and infra-red spectra.

EXAMPLE V

Methylation of Glutaronitrile

Glutaronitrile (1.3 g; 14 mmole) was added over a few minutes to a stirred solution of trimethylaluminium (5.4 ml; 54 mmole) in benzene (10 ml) in a stirred, nitrogen-flushed (25 ml) r.b. flask. A solution (2 ml) of nickel acetylacetonate (5 percent) in benzene was added in 0.2 ml portions, the first 1 ml during 4 hours at room temperature (exothermic reaction here necessitated occasional cooling), and a further 1.0 ml during 40 hours at +30°.

The reaction product was hydrolyzed, using a mixture of ether and dilute aqueous hydrochloric acid, and distilled (b. 110°/10mm) to give heptan-2,6-dione (0.60 g; 34% yield) as a pale brown oil. The heptan-2,6-dione was characterized by its mass spectrum and p.m.r. and infra-red spectra.

A further experiment in which glutaronitrile (7 mmole) was reacted with nickel acetylacetonate (5 mole percent) and trimethylaluminium (31 mmole) in benzene at room temperature for 7 days gave crude heptan-2,6-dione (426 mg; 47 percent yield) as a colourless solid melting below 32°.

EXAMPLE VI

Methylation of p-chlorophenylacetonitrile

Trimethylaluminium (495 mg; 6.9 mmole) in toluene was added dropwise to p-chlorophenylacetonitrile (487 mg; 3.2 mmole) plus nickel acetylacetonate (26 mg; 3 mole percent w.r.t. nitrile) in toluene at −20° to −15°. Reaction was completed at room temperature. Hydrolysis and g.l.c. indicated that after 3 days reaction conversion to p-chloro-phenylacetone was 95% complete and after 10 days was entirely complete. After the 10 days, hydrolysis using ether and dilute aqueous hydrochloric acid gave p-chlorophenylacetone (370 mg, i.e. 66 percent yield), characterized by its p.m.r. spectrum.

EXAMPLE VII

Reaction of Benzonitrile with Triethylaluminium

Benzonitrile (3 mmole), in one case alone and in a second case with 3½ mole percent of nickel acetylacetonate, was mixed with triethylaluminium (4.75 mmole) in toluene at −15°. The mixtures were allowed to warm to room temperature and to remain overnight, and were then hydrolyzed using dilute aqueous hydrochloric acid. G.l.c. showed the product formed in the absence of nickel acetylacetonate to be 94 percent unchanged benzonitrile containing ca. 5 percent benzaldehyde and ca. 1 percent propiophenone. The product from the nickel-catalyzed reaction contained only ca. 5 percent unreacted benzonitrile, about 50 percent propiophenone and about 45 percent benzaldehyde. A sample of this propiophenone was isolated by g.l.c. and found to have an infra-red spectrum identical with that of authentic material.

We claim:

1. A method for effecting the reaction of an aluminum compound selected from the class consisting of aluminum trialkyls, aluminum triaryls and aluminum triaralkyls with a nitrile having a formula $R^1 - C \equiv N$ wherein $R^1$ is a straight or branched-chain, saturated or unsaturated, aliphatic or cycloaliphatic, aralkyl or an aryl group which comprises reacting said compounds in the presence of a transition metal catalyst where the metal is coordinated to an oxygen containing ligand, said catalyst being selected from the group consisting of cobalt acetylacetonate, iron acetylacetonate, nickel acetate, nickel stearate, nickel acetylacetonate, nickel bisacetylacetonate, nickel bisacetylacetonate dihydrate, nickel bis(diethyl oxaloacetate), and nickel .3 (ethyl acetoacetate) .5 (OH).

2. A method as claimed in claim 1, wherein the aluminum compound has the formula II and the nitrile has the formula I

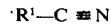 

$$R^1 - C \equiv N \qquad AlR^2_3$$

(I) \qquad\qquad (II)

wherein $R^1$ is selected from straight and branched chain, saturated and unsaturated, aliphatic and cycloaliphatic groups; aralkyl and aryl groups; and in which more than one nitrile group may be present; and each of the groups $R^2$ is selected from straight and branched chain, saturated and unsaturated alkyl groups containing up to about 20 carbon atoms; and wherein the $R^2$ groups may be substituted with simple aryl groups, which may be further substituted with groups selected from lower alkyl, lower alkoxyl and halogen.

3. A method as claimed in claim 1, wherein the reaction is conducted in the presence of a solvent which is inert with respect to the reactants and is selected from aromatic and aliphatic hydrocarbons and halogenated hydrocarbons.

4. A method as claimed in claim 1, wherein the reaction temperature is from about 20° to 50°C.

5. A method as claimed in claim 1, wherein the molar ratio of the aluminum compound to the nitrile is from about 1:1 to 2:1.

6. A method as claimed in claim 1, wherein the catalyst is present in an amount corresponding to about 0.1 to 5 mole percent based on the nitrile.

* * * * *